Jan. 28, 1969   J. DORY   3,423,992
ULTRASONIC APPARATUS FOR MEASURING THICKNESS OR DISTANCES
Filed Nov. 17, 1965   Sheet 1 of 3
Fig. 1
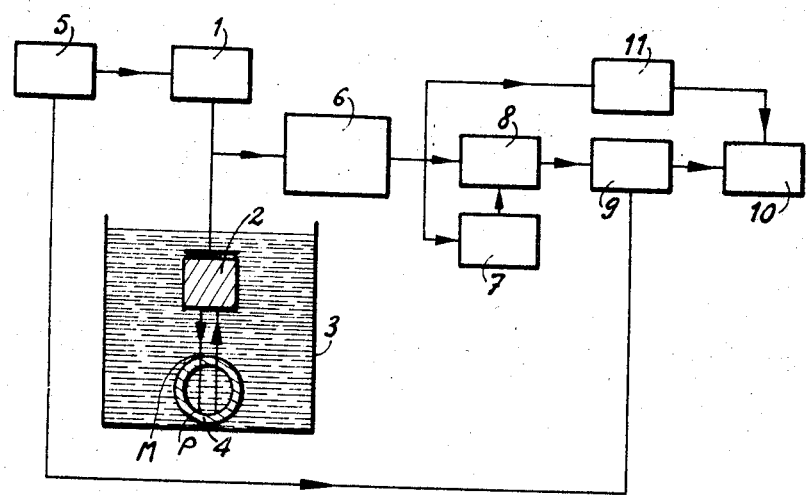
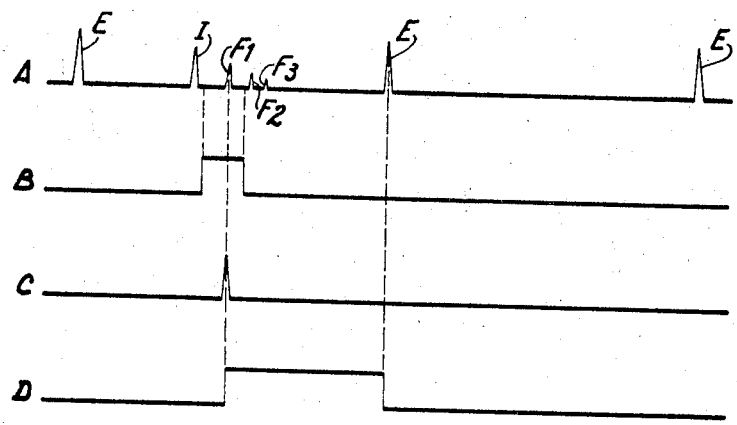
Fig. 2

United States Patent Office

3,423,992
Patented Jan. 28, 1969

3,423,992
ULTRASONIC APPARATUS FOR MEASURING
THICKNESS OR DISTANCES
Jacques Dory, Paris, France, assignor to Realisations
Ultrasoniques, Villenoy-Meaux, Seine-et-Marne,
France, a limited company
Filed Nov. 17, 1965, Ser. No. 508,348
Claims priority, application France, Nov. 25, 1964,
996,258
U.S. Cl. 73—67.9
Int. Cl. G01n 9/24
2 Claims

ABSTRACT OF THE DISCLOSURE

The invention is broadly concerned with thickness or distance measurement through the ultrasonic pulse echo method. The instant invention provides means whereby the display or recording of the measuring signals is temporarily inhibited each time the propagation of the ultrasonic pulses is disturbed, thus avoiding errors in the measurement.

---

The present invention relates to ultrasonic apparatus for measuring thickness or distance i.e. by utilising the propagation of ultrasonic waves within the part being examined, and their reflection from the base or bottom of said part.

Such apparatus usually measures either the time interval which separates an ultrasonic pulse emitted at the beginning of each operational cycle from the echo resulting from the first of the successive reflections which are produced from the base or bottom of the part or from the surface separating two media, during each cycle, or the time interval which separates two of the successive bottom echoes obtained in the course of the same operational cycle. The results of this measurement are displayed or recorded.

When it is desired to make a continuous measurement of the thickness of solid bodies whose surface is irregular, or more generally a measurement of distances in conditions such that the propagation of the ultrasonic waves can undergo sudden and/or large disturbances of short duration, known apparatus of this type generally gives results which are very difficult to interpret and which are unreliable.

The invention consist in ultrasonic apparatus for measuring thickness or distance by utilising the propagation of ultrasonic waves inside a member under examination and their reflection from the base or bottom of said member, said apparatus comprising means for producing measuring signals of an amplitude proportional to the time interval which separates two successive echoes, wherein means are provided for eliminating the display or recording of said measuring signals in the time intervals of duration of surface irregularities or disturbances in the propagation.

Preferably, the echoes are stored before display or recording, the storing device being blocked each time the bottom echo disappears.

Figure 3:
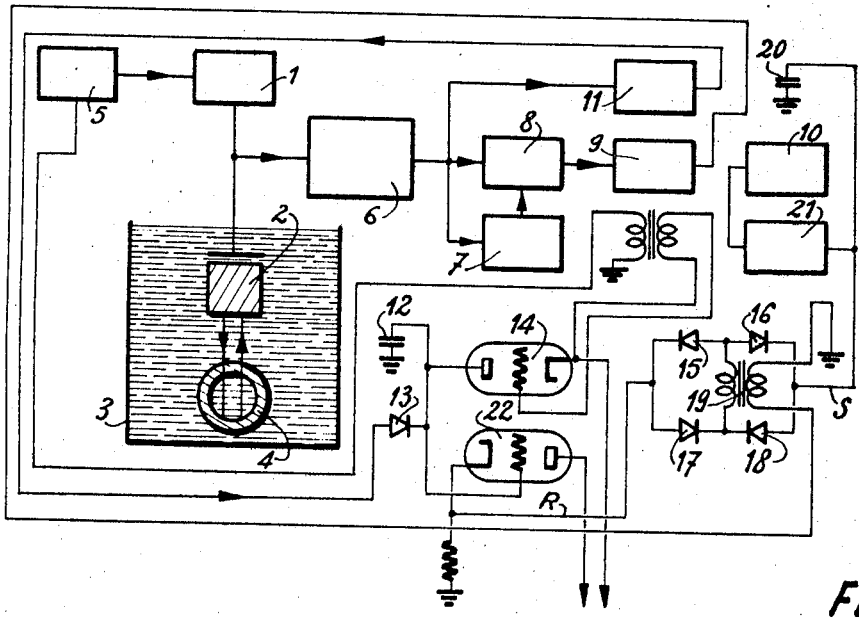
Figure 4:
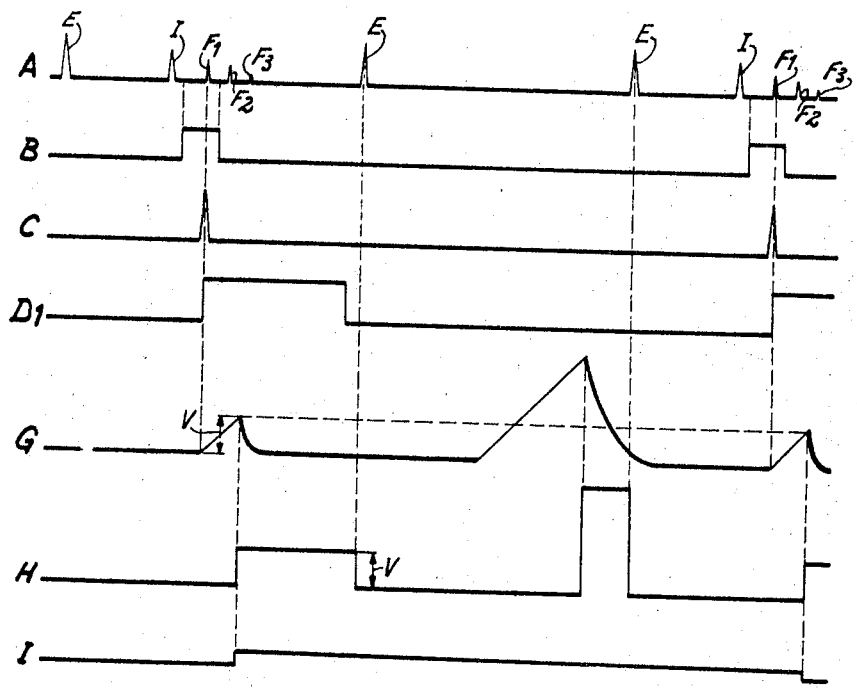
Figure 5:
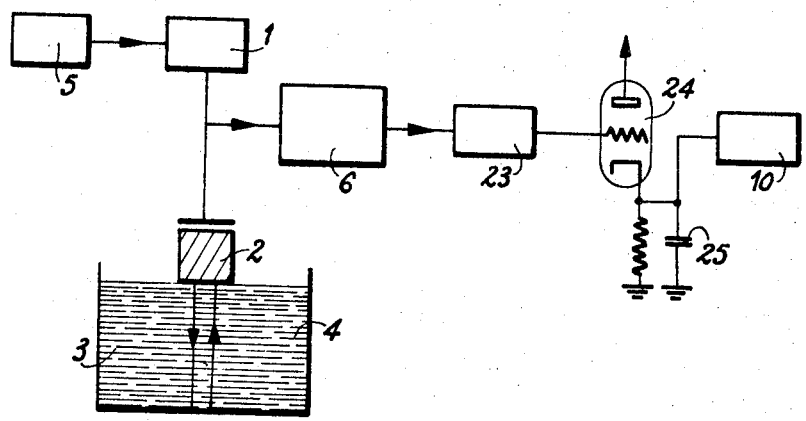
Figure 6:
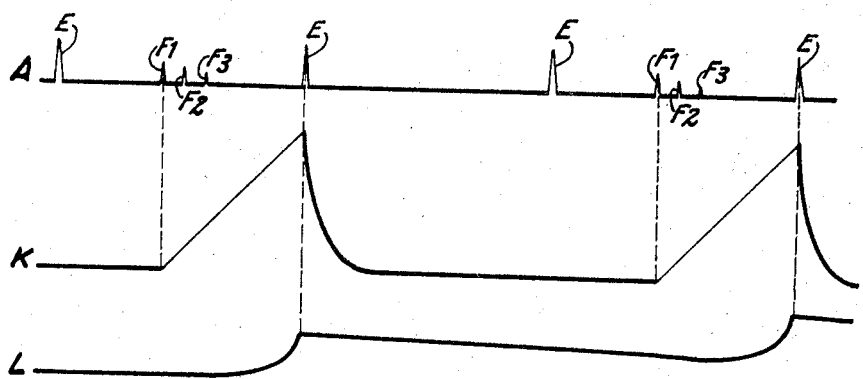

In order that the invention may be more clearly understood, reference will be made to the accompanying drawings which show some embodiments thereof by way of example, and in which:

FIGURE 1 shows a circuit diagram of a first embodiment of apparatus for measuring thicknesses according to the invention, FIGURE 2 shows pulse diagrams illustrating the operation thereof, FIGURE 3 shows a circuit diagram of a second embodiment, FIGURE 4 shows pulse diagrams illustrating the operation of the arrangement of FIGURE 3, FIGURE 5 shows a circuit diagram of a third embodiment, and FIGURE 6 shows pulse diagrams illustrating the operation of the arrangement of FIGURE 5.

The ultrasonic thickness gauge, schematically shown in FIGURE 1, comprises a high frequency electronic oscillator 1 which feeds an electroacoustic transducer 2 immersed in a container 3. The object to be measured is, in this embodiment, a tube 4 which is continuously moved, so as to be scanned by the ultrasonic beam emitted by the transducer 2.

A synchronsation generator 5 modulates in recurrent pulses the oscillation of the device 1 and serves in addition to synchronise the display device or recording apparatus.

The echoes received by a receiver 6 follow one another as shown at A in FIGURE 2, viz:

The emitted echo E, the "input echo" I (resulting from the reflection of the ultrasonic pulses at M from the surface of the tube), the bottom echoes $F_1$, $F_2$, $F_3$, (resulting from the successive reflections of the ultrasonic pulses at P). In the second cycle, it has been assumed that the bottom echoes have disappeared due to the presence of an irregularity on the surface of the tube.

The echoes are applied to a device 7 for generating a square wave voltage shown at B in FIGURE 2; it may be seen that the square wave is formed a short constant time interval after the pulse I, and covers a sufficient width for encompassing the echo $F_1$. This may be obtained by suitably adjusting the device 7, taking into account the limits of variation of the thickness to be measured, and thus the position of the echo $F_1$.

The square waves B are applied to a gating amplifier 8 which receives all the echoes and selects the bottom echoes $F_1$. The wave form C thus obtained is applied to a trigger circuit 9 which is thus triggered by the bottom echoes $F_1$ and moreover is returned to zero by the transmitted pulses supplied by the generator 5.

The square waves D thus produced by circuit 9 serve to trigger a recording apparatus 10 to which moreover is applied a saw-tooth voltage applied by a device 11 controlled by the receiver 6. In each cycle, the saw-tooth reaches a maximum amplitude proportional to the distance between two successive bottom echoes $F_1$ and $F_2$, and thus to the thickness MP to be measured. The device 11 includes a conventional saw-tooth generator and gating means, the said generator being controlled from the receiver through the said gating means, whereby echo $F_1$ starts the generation of the saw-tooth, and echo $F_2$ stops the said generation.

By way of example, the recording apparatus 10 is of the graphic recorder type comprising a stylus, the movement of which is controlled by the electrical signal to be recorded (in the present case the saw tooth output from the device 11) and a strip of electrochemical recording paper on which a recording is effected each time a suitable D.C. voltage is applied to the stylus. In the arrangement of FIGURE 1, this D.C. voltage is supplied by trigger circuit 9, for the duration of the square waves D. If the bottom echo disappears due to an irregularity on the surface of the tube under examination, the square wave disappears during the cycle or cycles where the irregularity appears, and there is no recording. Due to the brevity of each cycle, this absence of recording does not prevent the recording being interpreted.

This system does not prevent the device 11 from producing a saw-tooth which in the case of an irregularity in practice may acquire a very high amplitude. The result is that the stylus of the recording apparatus then undergoes a considerable displacement. If the irregularities occur at very short intervals, the stylus of the recording apparatus does not have the time to return to the position which corresponds to the thickness to be measured, and the results of the measurement are falsified.

This disadvantage is avoided in the embodiment shown in FIGURE 3.

Like reference numerals as in FIGURE 1 indicate like parts.

FIGURE 4 represents the pulses or wave forms at various points of the arrangement of FIGURE 3.

The wave forms ABC are the same as in FIGURE 2. On the other hand, the wave form $D_1$ produced by the trigger circuit 9 consists of square waves, the rear edge of which precedes by a constant duration the emitted pulse of the following cycle.

The wave form G shows the saw-tooth output produced by the device 11 which has already been mentioned in connection with the embodiment of FIGURE 1.

As in FIGURE 2, it has been assumed that there is an irregularity in the second cycle shown; in this case, the second saw-tooth has a considerable amplitude which does not correspond to any real thickness of the part. On the other hand, the third saw-tooth corresponds to a real thickness which has been assumed to be slightly smaller than in the first cycle.

A circuit connected to the output of the device 11 detects the peak amplitude of the saw-tooth and thus produces the wave form H.

In the embodiment illustrated in FIGURE 3, the peak-detecting circuit is essentially constituted by a capacitor 12 which is charged through a diode 13. The voltage at the terminals of the capacitor 12 is returned to a reference value (zero level of the square wave H), by the pulse E and by means of a triode 14. The latter is normally cut off by a suitable bias (not shown). When it is rendered conductive by the pulse E, voltage across the capacitor 12 is then returned to the reference value.

The capacitor 12 thus effects at each cycle the storing of the voltage V which measures the thickness of the part.

In the apparatus presently being described this voltage V is applied to the recording apparatus 10 only in the presence of the square waves $D_1$, i.e., in the absence of any surface irregularity.

To this end, the voltage V at the terminals of the capacitor 12 is applied to a relay device constituted in the following manner:

Two coupling devices, comprising diodes 15–16 and 17–18 (FIGURE 3) connected back to back in pairs, are in parallel between two points R and S.

The point common to the diodes 15 and 16 is connected to the point common to the diodes 17 and 18 through the secondary winding of a pulse transformer 19, the primary winding of which is connected to the output of the trigger circuit 9.

In the presence of the square wave $D_1$, the four diodes are rendered conductive: it results that the points R and S are connected together through the relay device. On the other hand, the connection between R and S is cut in the absence of a square wave $D_1$ applied to the relay device—the full stop remains but of course is written at the end of the sentence.

When the points R and S are connected together, the wave form H is transmitted, through the relay device, to a capacitor 20 which stores the voltage V of the square wave. This is produced for example during the first cycle shown in FIGURE 4. During the second cycle, there is no square wave, the points R and S are not connected together, even if the capacitor 20 remains charged to the same voltage V. During the third cycle, the square wave reappears, and the charge of the capacitor 20 slightly decreases, since it has been assumed that the thickness has decreased slightly. Thus the wave form I (FIGURE 4) is obtained; this wave form, after amplification by an amplifier 21, is applied to the recording apparatus 10.

In order to avoid the charge of the capacitor 20 reacting on that of the capacitor 12, a triode 22, connected as a cathode-follower, has been inserted between this latter capacitor and the point S.

In the case of the apparatus of the invention being intended to measure the depth of a liquid in a tank, a simplified embodiment thereof may be set up, as shown in FIGURE 5. In this drawing are shown certain of the elements of the two previous embodiments, designated by the same reference numerals.

FIGURE 6 illustrates the wave form at various points of the arrangement of FIGURE 5.

The wave form A shows the echoes at the output of the receiver 6.

In accordance with the invention, a generator 23 produces a wave form K, which consists in a saw-tooth the generation of which is started by the first bottom echo $F_1$ and stopped by the transmitted pulse E. Such a generator is of a conventional type and generally includes a condenser, the charge of which is controlled by $F_1$ and E.

It is from this saw-tooth wave form that the measuring voltage is produced. It will be remembered that when it is a question of measuring the depth of a liquid in a tank, as no medium is interposed between the transducer 2 and the liquid 4, instead of determining the time interval between two successive bottom echoes, such as $F_1$–$F_2$ for example, one will generally determine the time interval between the first bottom echo $F_1$ and the transmitted pulse E which follows.

It is obvious that in the case of a momentary disappearance of the bottom echo (caused for example by a ripple on the surface of the liquid, or, if it is a question of measuring distance in air, by a blast of air), contrarily to what happens in the testing of a solid object, no saw-tooth at all will be present in the disturbed cycle: this is the case for the second cycle shown in FIGURE 6.

A peak detector of very slow discharge is connected to the output of the device 23. Such a peak detector will advantageously be constituted by a triode 24 connected as a cathode-follower and including a high-value capacitor 25.

The voltage at the terminals of this capacitor, which will be applied to the recording apparatus 10, then has the wave form L (FIGURE 6): it may be seen that this voltage undergoes, a little before the emitted pulse which terminates a cycle, a variation which corresponds to the variation of thickness during this cycle. On the other hand, said voltage varies little during the rest of the cycle. Thus there has been stored, during the cycle during which there is no bottom echo, the thickness corresponding to the previous cycle. Of course, this simplified embodiment may be used only when the thickness to be measured undergoes comparatively slow variations.

What is claimed is:

1. An apparatus for measuring thickness or distance in a medium having at least first and second reflecting surfaces, said apparatus comprising: means for cyclically transmitting pulses of ultrasonic waves inside said medium through said first reflecting surface; means for receiving said transmitted pulses and the corresponding echo pulses reflected from said reflecting surfaces; means, connected to said receiver means, for generating a signal having an amplitude proportional to the time interval which separates two successive echo pulses reflected from said second reflecting surface; measuring means connected to said generating means for indicating said time interval; trigger means connected to said measuring means, said trigger means being adapted, when switched on, to authorize the operation of said measuring means, and, when switched out, to inhibit the operation of said measuring means; means, connected to said receiving means and controlled by an echo pulse reflected from said second reflecting surface for switching on said trigger means and means, controlled by the said transmitted pulse, for switching out said trigger means.

2. An apparatus for measuring thickness or distance in a medium having at least first and second reflecting surfaces, said apparatus comprising: means for cyclically transmitting pulses of ultrasonic waves inside said medium through said first reflecting surface; means for receiving said transmitted pulse and the corresponding echo pulses reflected from said reflecting surfaces; means, connected to said receiver means, for generating a signal having an amplitude proportional to the time interval which separates two successive echo pulses reflected from said second reflecting surface; measuring means for indicating said time intervals, first means, connected to said generating means, for storing the peak amplitude of said signal; second means, connected to said measuring means, for storing the amplitude variation of said signal from one cycle to the following; relay means connecting said first storing means to said second storing means and means, controlled by an echo pulse reflected from said second reflecting surface, for switching on said relay means.

References Cited

UNITED STATES PATENTS 3,280,622 10/1966 Carlin _____ 73—67.9
3,169,393 2/1965 Stebbins _____73—67.9

FOREIGN PATENTS 469,417 7/1937 Great Britain.

RICHARD C. QUEISSER, *Primary Examiner.*

JOHN R. FLANAGAN, *Assistant Examiner.*